United States Patent
Duluk, Jr. et al.

(10) Patent No.: US 9,401,004 B2
(45) Date of Patent: Jul. 26, 2016

(54) STATE SHADOWING TO SUPPORT A MULTI-THREADED DRIVER ENVIRONMENT

(75) Inventors: Jerome Francis Duluk, Jr., Palo Alto, CA (US); Jesse David Hall, Santa Clara, CA (US); Patrick R. Brown, Wake Forest, NC (US); Gregory Scott Palmer, Cedar Park, TX (US); Eric S. Werness, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 902 days.

(21) Appl. No.: 12/902,937

(22) Filed: Oct. 12, 2010

(65) Prior Publication Data

US 2011/0084977 A1    Apr. 14, 2011

Related U.S. Application Data

(60) Provisional application No. 61/251,267, filed on Oct. 13, 2009.

(51) Int. Cl.
*G06T 1/00* (2006.01)
*G06T 1/60* (2006.01)
*G09G 5/36* (2006.01)

(52) U.S. Cl.
CPC *G06T 1/60* (2013.01); *G09G 5/363* (2013.01); *G06T 2210/32* (2013.01); *G09G 2360/06* (2013.01); *G09G 2360/08* (2013.01)

(58) Field of Classification Search
CPC ... G06T 1/60; G06T 2210/32; G09G 2360/06

USPC .......................................................... 345/522
See application file for complete search history.

(56) References Cited

U.S. PATENT DOCUMENTS

| | | | | |
|---|---|---|---|---|
| 4,355,389 A * | 10/1982 | Sato et al. | ........................ | 714/31 |
| 5,155,822 A * | 10/1992 | Doyle et al. | .................. | 711/202 |
| 6,104,415 A * | 8/2000 | Gossett | ........................ | 345/552 |
| 6,115,054 A * | 9/2000 | Giles | .............................. | 345/522 |
| 6,208,361 B1 * | 3/2001 | Gossett | ........................ | 345/536 |
| 6,462,743 B1 * | 10/2002 | Battle | ........................... | 345/506 |
| 6,934,832 B1 * | 8/2005 | Van Dyke et al. | ............ | 712/244 |
| 2006/0152509 A1 * | 7/2006 | Heirich | ......................... | 345/426 |
| 2007/0230369 A1 * | 10/2007 | McAlpine | ..................... | 370/256 |
| 2008/0007563 A1 * | 1/2008 | Aronson et al. | .............. | 345/589 |
| 2008/0252647 A1 * | 10/2008 | Rai et al. | ....................... | 345/520 |
| 2008/0256455 A1 * | 10/2008 | Della Ripa et al. | ........... | 715/735 |

* cited by examiner

*Primary Examiner* — James A Thompson
*Assistant Examiner* — Tapas Mazumder
(74) *Attorney, Agent, or Firm* — Artegis Law Group, LLP

(57) ABSTRACT

One embodiment of the present invention sets forth a technique for tracking and filtering state change methods provided to a graphics pipeline. State shadow circuitry at the start of the graphics pipeline may be configured in different modes. A track mode is used to capture the current state by storing state change methods that are transmitted to the graphics pipeline. A passthrough mode is used to provide different state data to the graphics pipeline without updating the current state stored in the state shadow circuitry. A replay mode is used to restore the current state to the graphics pipeline using the state shadow circuitry. Additionally, the state shadow circuitry may also be configured to filter the state change methods that are transmitted to graphics pipeline by removing redundant state change methods.

19 Claims, 9 Drawing Sheets

STATE SHADOWING TO SUPPORT A MULTI-THREADED DRIVER ENVIRONMENT

CROSS-REFERENCE TO RELATED APPLICATIONS

This application claims priority benefit to U.S. provisional patent application titled, "STATE SHADOWING TO SUPPORT A MULTI-THREADED DRIVER ENVIRONMENT," filed on Oct. 13, 2009 and having Ser. No. 61/251,267.

BACKGROUND OF THE INVENTION

1. Field of the Invention

Embodiments of the invention relate generally to graphics processing, and more specifically to tracking and accessing state change methods in a graphics pipeline.

2. Description of the Related Art

Graphics hardware maintains state about the current configuration of the various pipeline stages used to perform rendering. Some examples are the state of the blending hardware used for raster operations or the state of the stencil or depth test functions. The exact image generated by the graphics hardware for display is a function of all the prior state change methods (i.e., state change commands) that the driver has sent to configure the graphics pipeline. This serialization of state makes the generation of image data based on those state change methods very difficult in a multi-threaded or multi-core driver environment since the state for different threads may be different and the driver may not be able to determine the state that is currently used by the graphics pipeline.

Accordingly, what is needed is a technique for accessing prior state change methods in a multi-threaded or multi-core driver environment.

SUMMARY OF THE INVENTION

A system and method for accessing prior state change methods in a multi-threaded or multi-core driver environment tracks the state change methods that are transmitted to the graphics pipeline. A copy of the current state is tracked and stored in front end unit as the state change methods are transmitted to one or more parallel graphics pipelines. The driver may disable the tracking function and override the current state used by the one or more parallel graphics pipelines in order to perform a particular function. After completing the function, the current state of the one or more parallel graphics pipelines may be restored using the copy of the previously saved state to retransmit the state change methods. Additionally, the front end unit may be configured to filter the state change methods that are transmitted to the one or more graphics pipelines by removing redundant state change methods. The driver does not need to maintain a copy of the current state and is able to reconfigure the state as needed to perform a particular function.

Various embodiments of a method of the invention for shadowing state data include configuring a front end unit of a graphics processing unit (GPU) to operate in a track mode and receiving, by the front end unit, a first state change method including first state data. The first state data is written to a state shadow memory within the front end unit and the first state data is transmitted to a graphics processing pipeline.

Various embodiments of the invention include a system for shadowing state data. The system includes a graphics processing unit (GPU) comprising a front end unit that includes a state shadow memory. The front end unit is configured to operate in a track mode, receive a first state change method including first state data, write the first state data to the state shadow memory, and transmit the first state data to a graphics processing pipeline.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
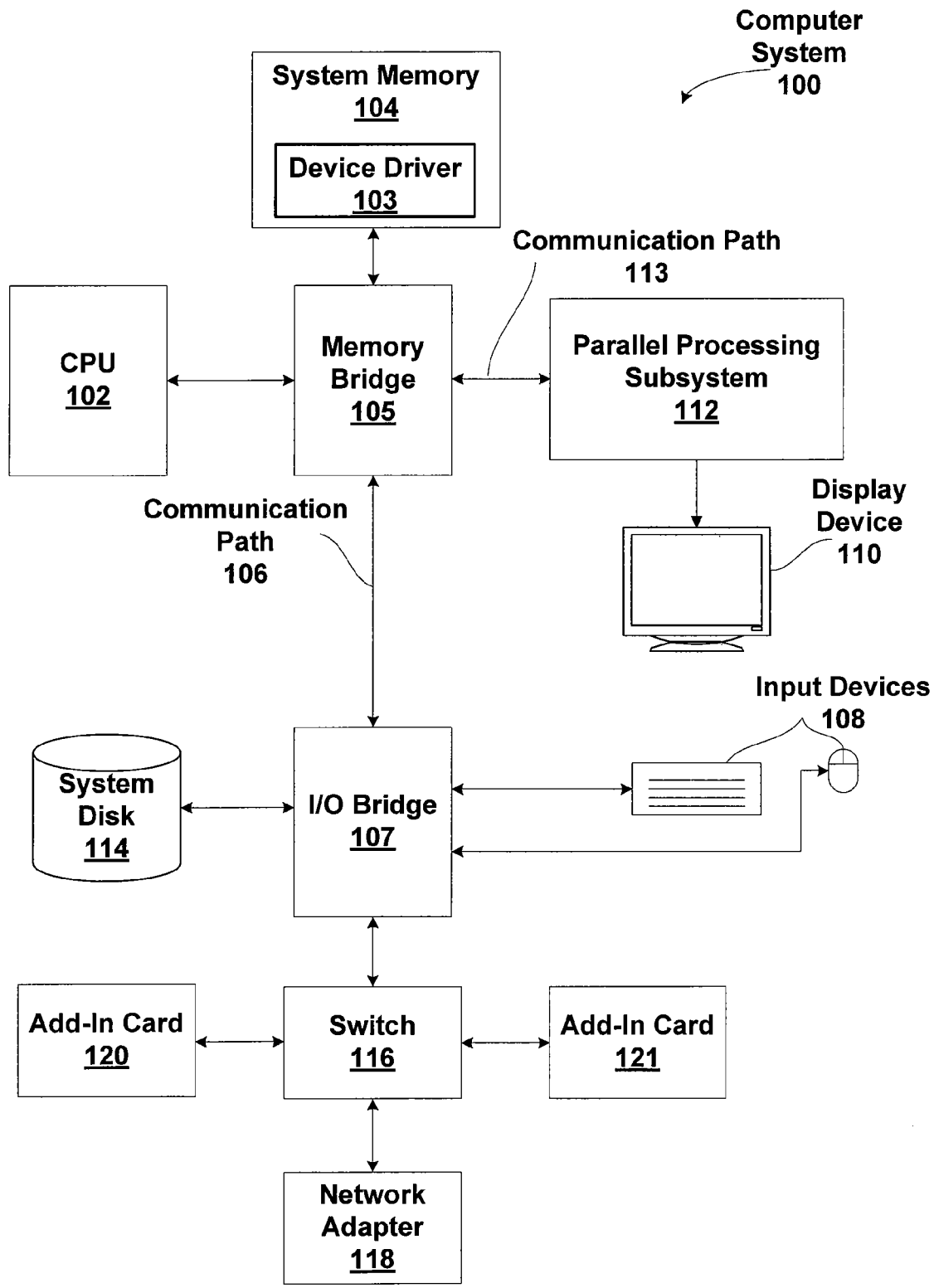
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
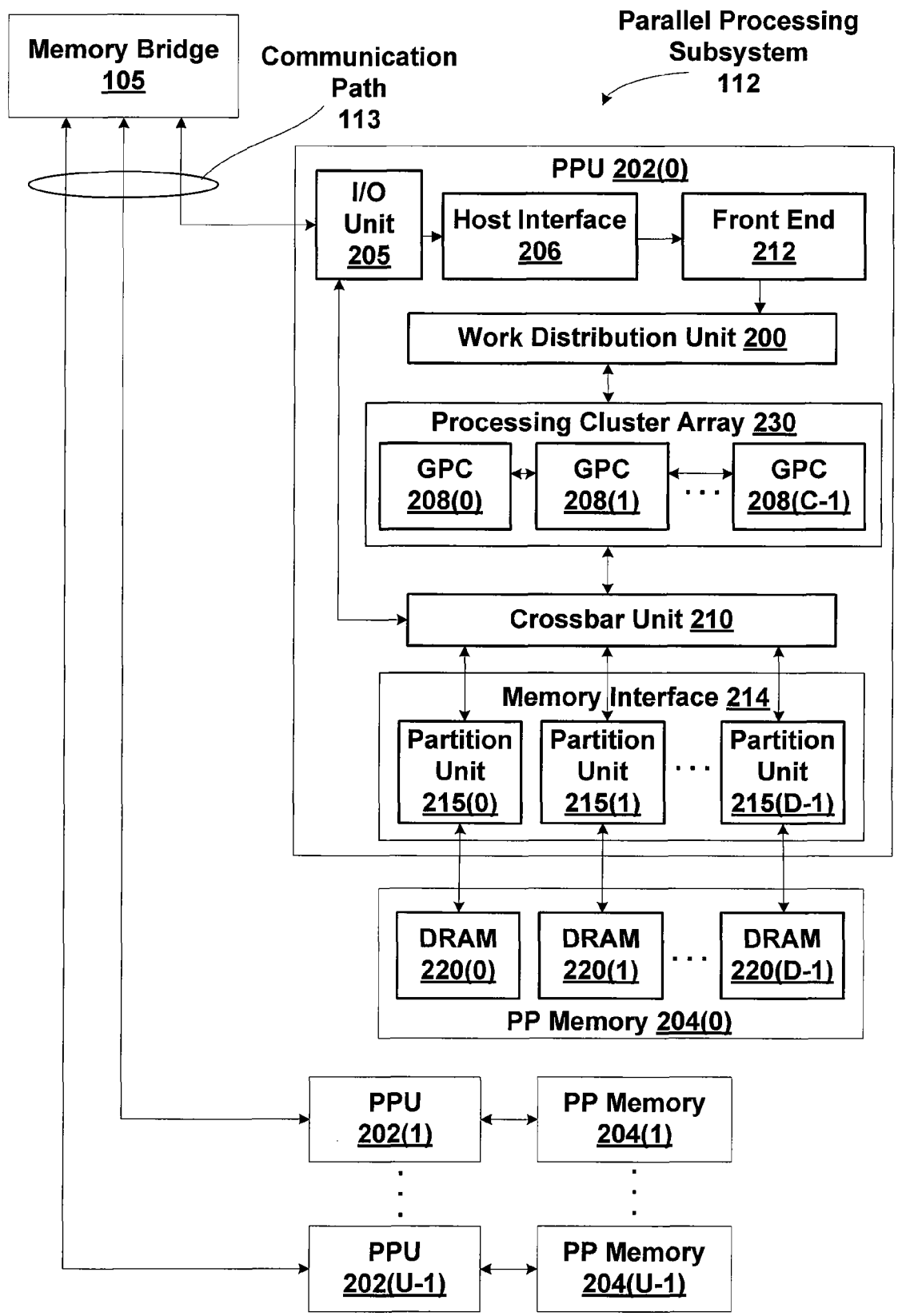
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U☐1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C☐1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D☐1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
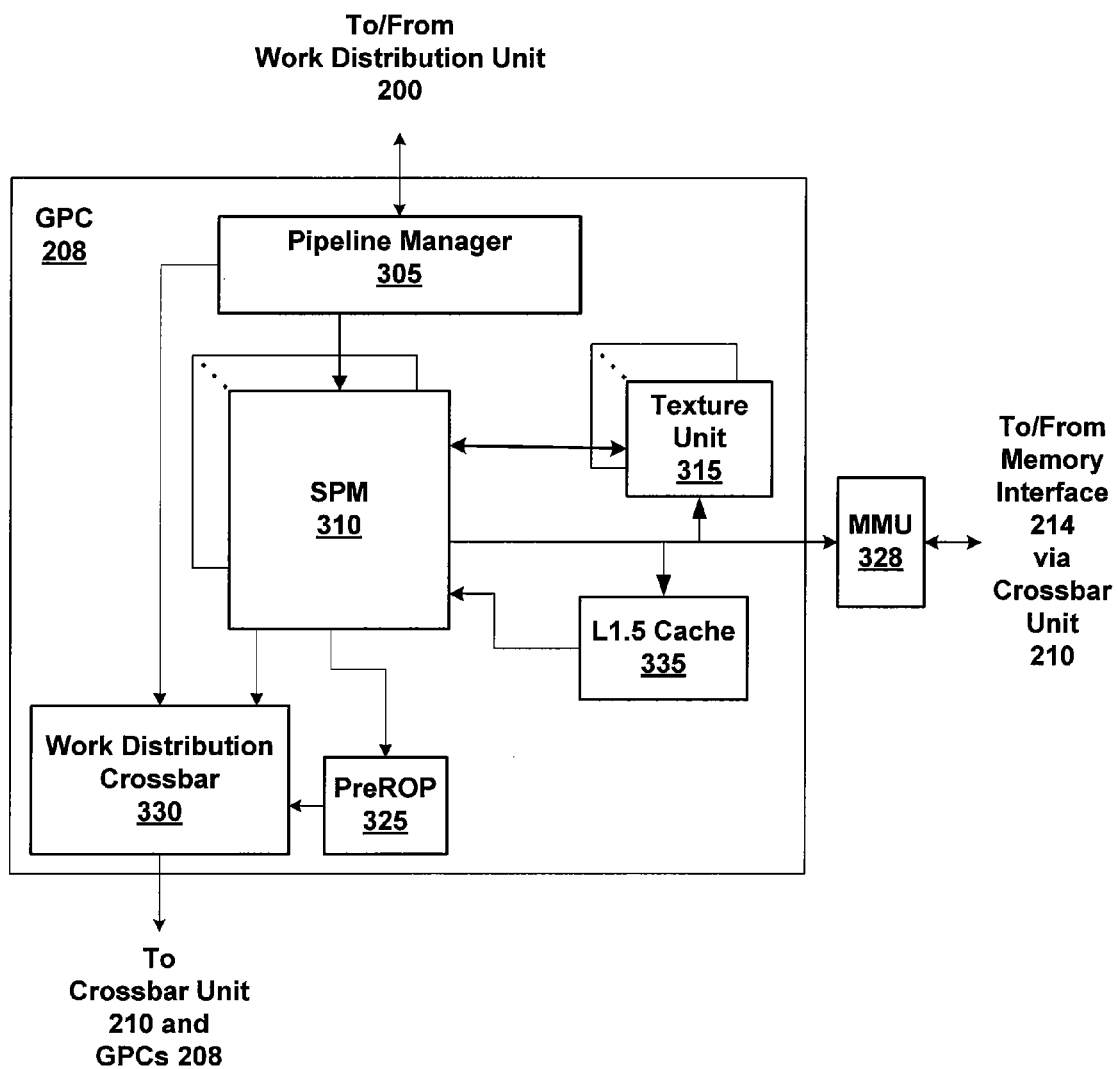
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104.

It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
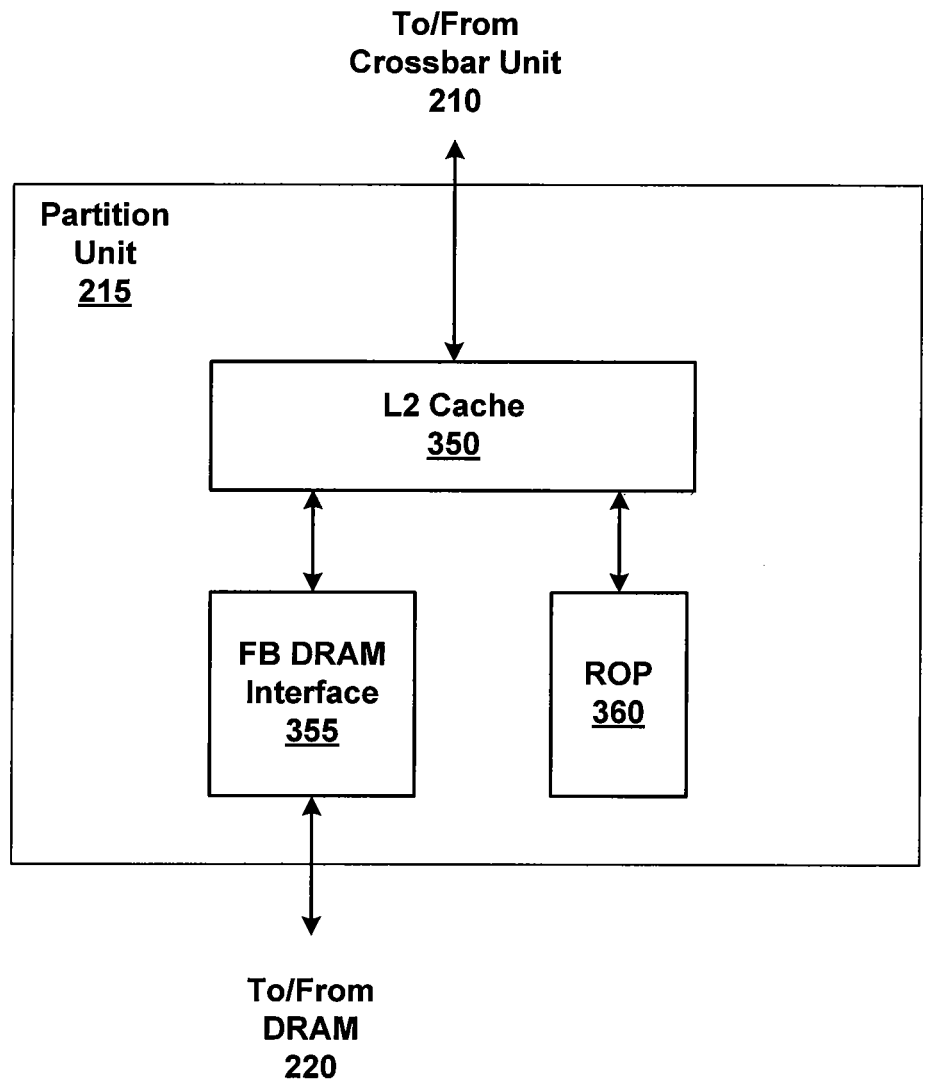
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAS, the threads of a CTA might or might not actually share data with each other, depending on the CTA program, and the terms "CTA" and "thread array" are used synonymously herein.

Figure 3C:
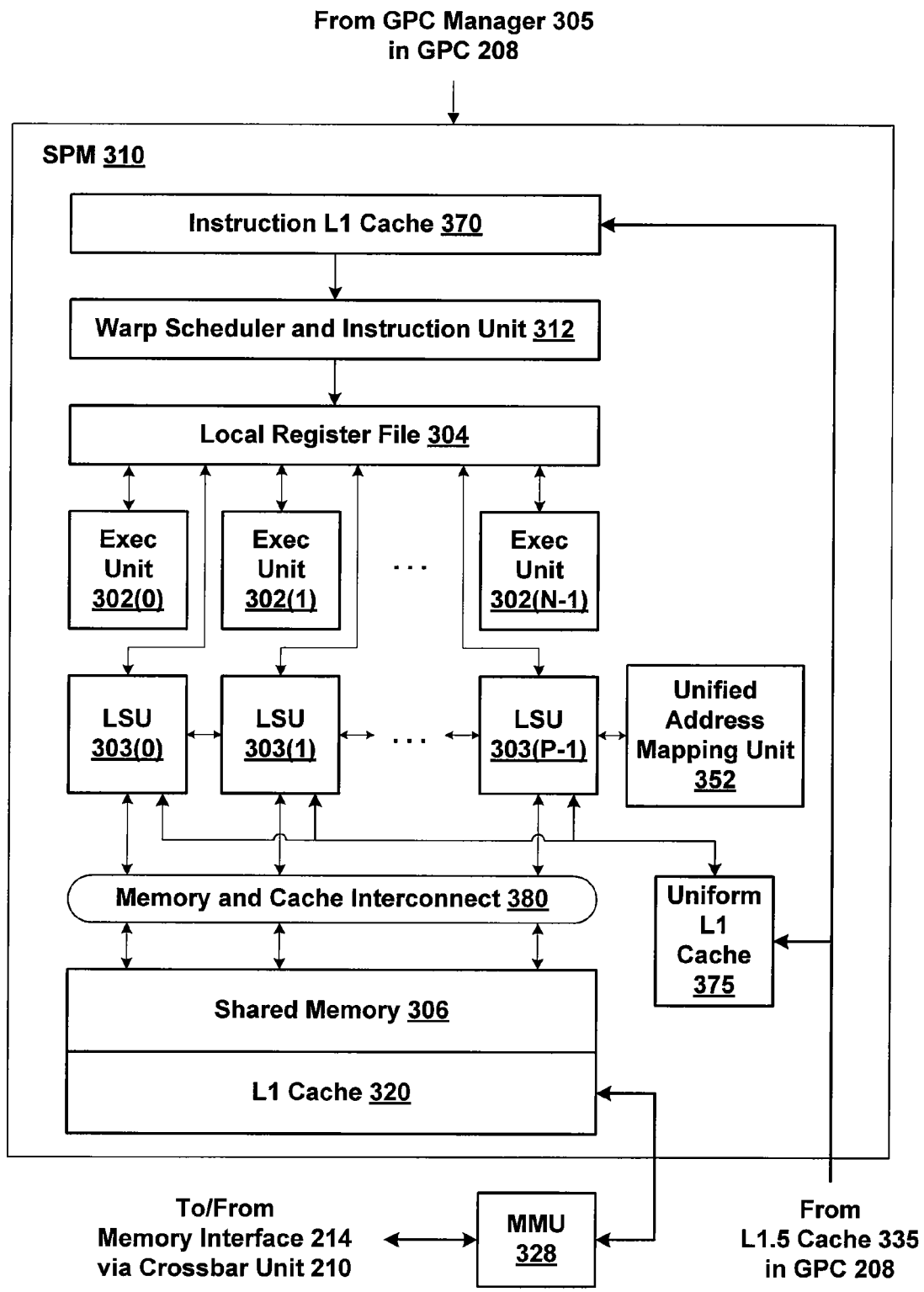
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Graphics Pipeline Architecture

Figure 4:
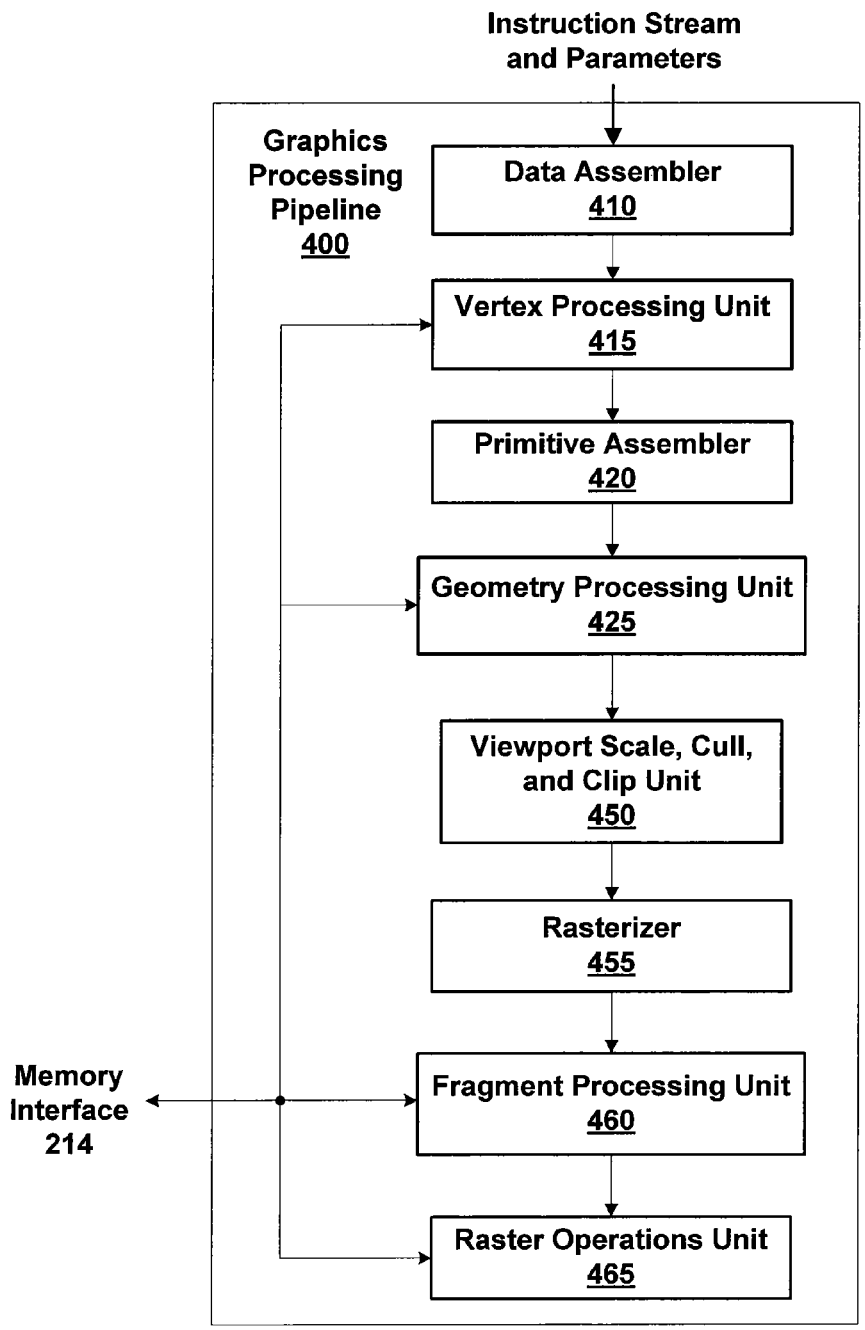
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Although the method steps are described in conjunction with the systems of FIGS. 1, 2, 3A, 3B, and 3C, persons skilled in the art will understand that any system configured to perform the method steps, in any order, is within the scope of the inventions.

State Shadowing and Filtering

The front end 212 includes circuitry to track and store state change methods that are transmitted to the GPCs 208 and represent the current state of the graphics processing pipeline 400, i.e., GPCs 208, SPMs 310 within the GPCs 208, and partition units 215. The current state of the graphics processing pipeline 400 is stored in a state shadow RAM in the front end 212. The device driver 103 may access the stored current state, reconfigure the graphics processing pipeline 400 to use a different state, and then restore the current state. Additionally, the circuitry in the front end 212 may be configured to filter the state change methods that are transmitted to the (graphics processing pipelines 400 via the) GPCs 208 by removing redundant state change methods.

Figure 5:
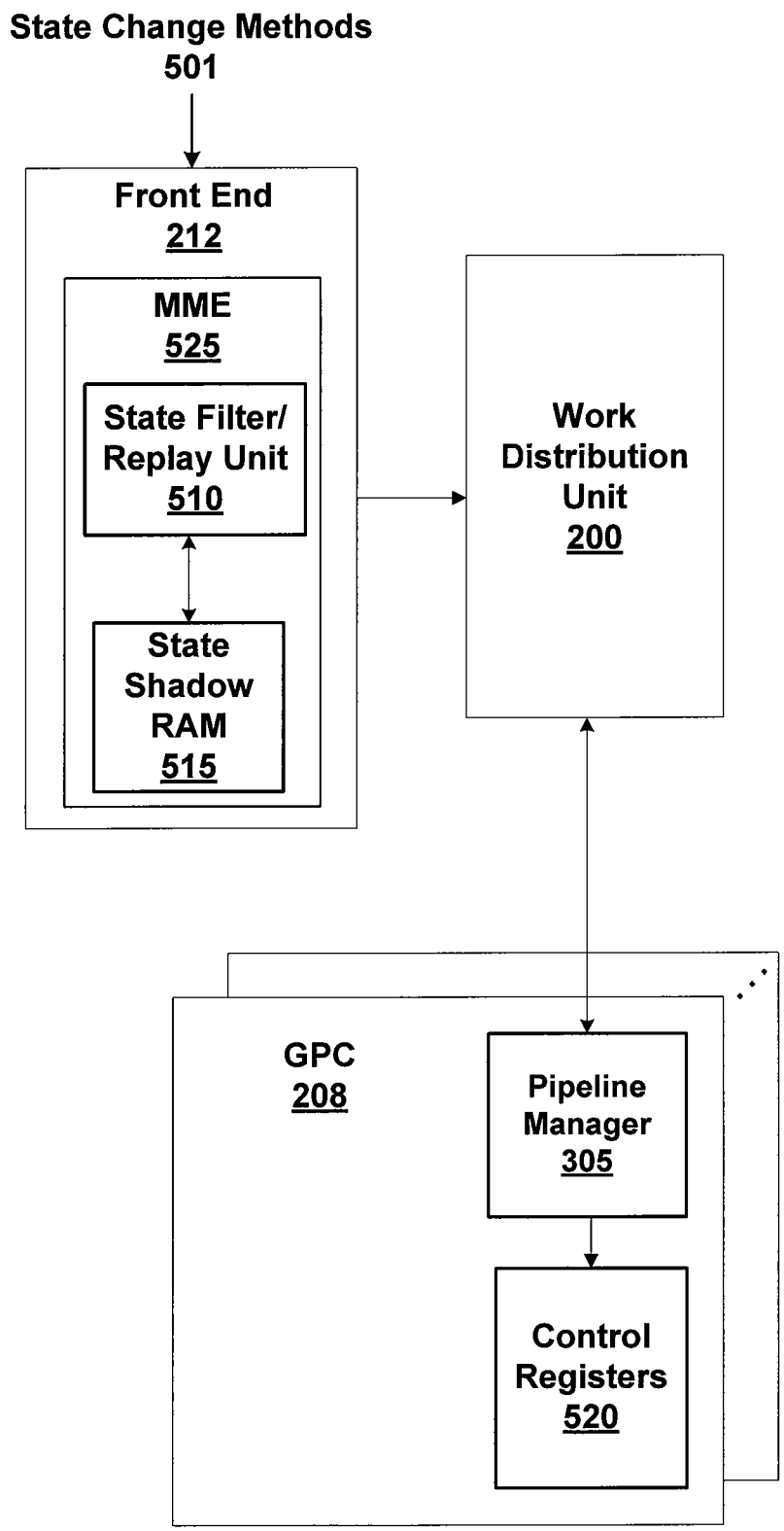
FIG. 5 is a block diagram of a portion of the PPU of FIG. 2, according to one embodiment of the present invention.

FIG. 5 is a block diagram of a portion of the PPU 202 of FIG. 2, according to one embodiment of the present invention. The PPU 202 is configured to function as a GPU and the GPCs 208, SPMs 310, and partition unit 215 are configured to function as graphics processing pipelines 400. The front end 212 receives work specified by pushbuffers, including state change methods 501 and shader program instructions for execution by the graphics processing pipelines 400. The shader program instructions are output by the front end 212 to the GPCs 208 via the work distribution unit 200.

The state change methods are received by a MME 525 that is a programmable sequencer configured to perform method macro expansion in order to reduce the PCI-E bandwidth required to deliver state changes to the GPCs 208. Methods are sent by the device driver 103 in a compressed format as macros, and then expanded by the front end 212. Common sequences of methods may be encoded as a single CallMmeMacro method, saving time in the device driver 103, storage space in the pushbuffer memory, and bandwidth into the front end 212. An initial address for execution of a macro program is loaded and the MME 525 then increments a program counter until the end of the macro program is detected, or a branch instruction alters the flow of control.

The MME 525 converts state change methods into writes to control registers 520 in the GPCs 208. Additional control registers (not shown) may be included in the partition units 215 to store state data that is specific to the ROP 360. The control register writes are output by the front end 212 to the GPCs 208 via the work distribution unit 200 and pipeline managers 305. Each control register within control registers 520 may store the current state for a different portion of the graphics processing pipeline 400. Therefore, the control registers 520 may loaded at different times in order to synchronize with the processing being performed by the particular portion of the graphics processing pipeline 400.

The MME 525 includes a state filter/replay unit 510 and a state shadow RAM 515 that stores the current state represented by the state change methods that are transmitted by the front end 212 to the GPCs 208. The device driver 103 typically does not maintain a copy of the state methods that have been provided to the graphics processing pipelines 400 due to the complications of tracking the state in a multi-threaded system. In such a system, multiple processing threads on the CPU 102 may independently send state change methods to the PPU 202, with each thread being unaware of the commands transmitted by the other threads. The device driver 103 may instruct the state filter/replay unit 510 in the MME 525 to stop tracking state, change the state used in the graphics processing pipelines 400 (bypassing the state shadow RAM 515), send a sequence of drawing commands using this updated state, and then instruct the state filter/replay unit 510 MME 525 to "replay" the state and configure the graphics processing pipelines 400 using the tracked state stored in the state shadow RAM 515. This allows the device driver 103 to repurpose the graphics processing pipelines 400, configure the state for a temporary optimization or to perform a particular function, then restore the graphics processing pipelines 400 to the previous state. The device driver 103 does not need to maintain a copy of the current state. In this model, the state shadow RAM 515 serves as a 1-deep stack for saving and restoring the state of the graphics processing pipelines 400.

The state filter/replay unit 510 may be configured to operate in one of several different modes: track, passthrough, replay, and track and filter. The mode is configured by the SetMmeShadowRamControl method. When the state filter/replay unit 510 is configured in the track mode, the method data for each state change method for which space has been allocated in the state shadow RAM 515 is written in the state shadow RAM 515. If space has not been allocated in the state shadow RAM 515 to store a particular state change method, then the state shadow RAM 515 is not written. In either case, the state change method passes through the MME 525 unchanged and is converted to a control register write by the front end 212 for output to the GPCs 208.

In one embodiment, space in the state shadow RAM 515 is statically allocated when a device, e.g., PPU 202, is built and the "most useful" methods are designated to be shadowed (written to the state shadow RAM 515). In addition, a set of wildcard methods exist which do nothing, but are also shadowed. The wildcard methods do not produce a control register write, but instead allow the MME 525 or device driver 103 to save extra state in the state shadow RAM 515, which may be accessed as inputs during the processing of macro commands in the MME 525. Alternatively, the wildcard methods may be used to shadow a method that was not included in the "most useful" list.

When the state filter/replay unit 510 is configured in the passthrough mode, the state shadow RAM 515 is never written, even for state change methods that would be written during the track mode. The state change method passes through the MME 525 unchanged and is converted to a control register write by the front end 212 for output to the GPCs 208. The passthrough mode is used to allow the device driver 103 to temporarily override the current state of the graphics processing pipelines 400 to perform a different function. As previously explained, the shadow state RAM 515 will continue to store the previously specified state, while the graphics processing pipelines 400 operate in a temporary state controlled by the device driver 103.

To restore the current state using the state data stored in the shadow state RAM 515, the replay mode is used. When the state filter/replay unit 510 is configured in the replay mode, the state shadow RAM 515 is read instead of written. When an incoming method is found in the shadow state RAM 515, the state data specified in the method is replaced with the corresponding state data stored in the shadow state RAM 515 and the state change method is converted to a control register write by the front end 212 for output to the GPCs 208. When an incoming method is not shadowed by the shadow state RAM 515, the method is simply discarded by the state filter/replay unit 510. A simple loop implemented by the MME 525 or the device driver may be used to restore all of the shadowed state data that is stored in the control registers 520 within the GPCs 208.

When the state filter/replay unit 510 is configured in the track and filter mode, the state data for an incoming state change method for which space has been allocated in the state shadow RAM 515 is read from the state shadow RAM 515. If the state data read from the state shadow RAM 515 matches the state data in the incoming state change method, then the incoming state change method is discarded by the state filter/replay unit 510 since the incoming state change method is redundant. This feature reduces power consumption and reduces the number of writes to the control registers 520. Additionally, writes to the control registers 520 may have significant side effects, such as invalidating caches. Therefore, eliminating redundant writes to the control registers 520 may improve cache performance.

In the track and filter mode, when the state data read from the state shadow RAM 515 does not match the state data in the incoming state change method, the state data in the incoming state change method is written to the state shadow RAM 515. The incoming state change method passes through the MME 525 unchanged and is converted to a control register write by the front end 212 for output to the GPCs 208. If space has not been allocated in the state shadow RAM 515 to store an incoming state change method, then the state shadow RAM 515 is not written, the state change method passes through the MME 525 unchanged and is converted to a control register write by the front end 212 for output to the GPCs 208. The software program is responsible for making sure that the state shadow RAM 515 exactly matches the current state stored in the control registers 520 before putting the MME 525 into the track and filter mode.

When a method indicating a macro program is transmitted to the MME 525 by the device driver 103, the MME will execute a sequence of instructions to generate and transmit methods processed by remainder of the graphics processing pipeline. The methods generated by MME program invocations will often be based on input parameters transmitted with the macro program method. Additionally, MME instructions are capable of reading values from the state shadow RAM 515. This capability allows the MME 525 to perform state validation operations, where the value of one portion of graphics pipeline state is derived based on the values of other state.

In one example of state validation, the Direct3D graphics API specifies that rasterization in the graphics pipeline must be disabled when either: (a) the pixel shader, depth test, and stencil test are disabled or (b) none of the four geometry shader output streams are selected for rasterization. To implement this state validation in the MME 525, the device driver 103 replaces the state change methods to update the pixel shader, depth test, stencil test, and geometry shader output stream selection with macro program invocation methods. The macro program for pixel shader updates receives and re-transmits the new pixel shader enable state as data associated with the macro program invocation. The macro program additionally reads the state of the depth test, stencil test, and geometry shader output stream selection from the state shadow RAM 515, determines if rasterization should be disabled according to API requirements, and transmits a new method to enable or disable rasterization accordingly. The methods for other state changes involved in this logic may be replaced by similar macros. The availability of the shadow RAM 515 to MME macro instructions allows the device driver 103 to re-derive the rasterization state on a state update, which would otherwise require additional computation on the CPU 102 or require expensive synchronization operations if the state were specified using multiple execution threads.

Figure 6A:
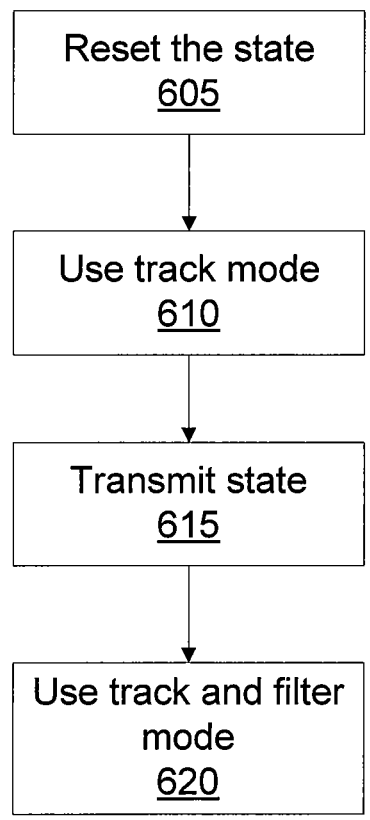
FIG. 6A is a flow diagram of steps for tracking the state change methods, according to one embodiment of the present invention.

FIG. 6A is a flow diagram of steps for tracking the state change methods, according to one embodiment of the present invention. At step 605 the state filter/replay unit 510 is reset and the state data stored in the state shadow RAM 515 is reset. This step is performed by the MME 525 or device driver 103 to initialize the state data. At step 610 the state filter/replay unit 510 is configured to operate in the track mode to write state data to the state shadow RAM 515. At step 615 the MME 525 or device driver 103 transmits state change methods to the state filter/replay unit 510 and the method data for each state change method for which space has been allocated in the state shadow RAM 515 is written in the state shadow RAM 515 as the current state. The state data is also transmitted to the GPCs 208 and is written to the control registers 520 as the current state. Note that step 605 may be used to clear any unwanted state data stored in the state shadow RAM 515. Typically, state data is simply overwritten by new state data and the state stored in the state shadow RAM 515 matches the state stored in control registers 520 (after any in-flight control register writes are completed).

At step 620 the state filter/replay unit 510 is configured to operate in the track and filter mode to write only non-matching state data to the state shadow RAM 515 and to filter the state by discarding redundant state change methods. State filtering saves power since downstream pipeline stages are prevented from having to pass redundant state data from unit to unit, and the final stage does not have to process a redundant state change. State filtering also improves performance since the GPCs 208 can reach idle more quickly, which often is used as a synchronization event to the device driver 103.

Figure 6B:
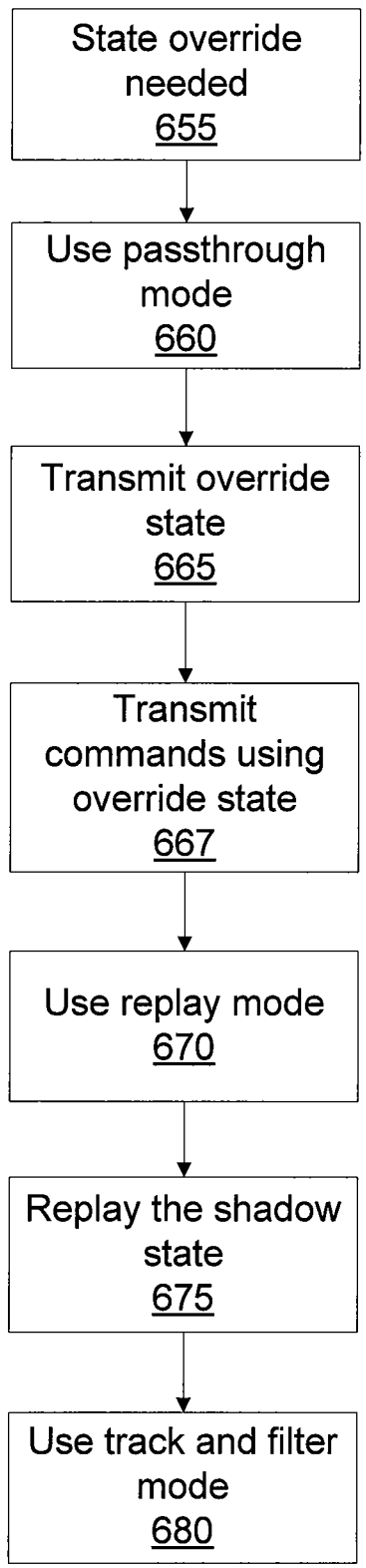
FIG. 6B is a flow diagram of steps for bypassing the current state and later retransmitting the state change methods to restore the current state, according to one embodiment of the present invention.

FIG. 6B is a flow diagram of steps for bypassing the current state and later retransmitting the state change methods to restore the current state, according to one embodiment of the present invention. At step 655 the device driver 103 or MME 525 determines that the current state should be overridden. As one example, the device driver 103 may need to override the current state to clear a surface stored in the frame buffer when an API requires that a non-bound surface (render target or non-render target) needs to be cleared and the PPU 202 only supports clearing of bound render targets. In this case, the device driver 103 may override the current state to bind a surface as a render target and perform the clear operation while bypassing the state shadow RAM 515. The current state and particularly the current set of render targets may then be restored.

At step 660 the state filter/replay unit 510 is configured to operate in the passthrough mode so that the current state stored in the state shadow RAM 515 is retained during the override. At step 665 the MME 525 or device driver 103 transmits state change methods to the front end 212 and the state filter/replay unit 510 simply ignores the state change methods. The state data is transmitted to the GPCs 208 and is written to the control registers 520 as override state that may be different from the original state that remains stored in the state shadow RAM 515. At step 667, the MME 525 or device driver 103 transmits additional commands using the now-overridden state. In the example above involving clearing non-bound surfaces, step 665 will effect a temporary binding and step 667 will perform a clear.

At step 670 the state filter/replay unit 510 is configured to operate in the replay mode so that the current state stored in the state shadow RAM 515 replaces the state data in the incoming state change methods. At step 675 the MME 525 or device driver 103 transmits state change methods to the state filter/replay unit 510. When an incoming method is shadowed by the shadow state RAM 515, the state data in the method is replaced with the state change data from the shadow state RAM 515 and the state change method and is converted to a control register write by the front end 212 for output to the GPCs 208. When an incoming method is not shadowed by the shadow state RAM 515, the method is simply discarded by the state filter/replay unit 510. The set of methods transmitted in step 675 is typically the same set of methods transmitted in step 665; a new method is sent for each piece of overridden state to restore the contents of the control registers 520 to their original values. At step 680, the state filter/replay unit 510 is configured to operate in the track and filter mode to write only non-matching state data to the state shadow RAM 515 and to filter the state by discarding redundant state change methods.

The steps shown in FIG. 6B may be used to process two CPU threads, each generating a series of methods, where the methods from the first thread are sent to the graphics processing pipelines 400 via the GPCs 208, followed by the methods from the second thread. If the second thread needs to borrow the graphics processing pipelines 400 for an operation such as a formatted block transfer, the second thread would send the methods to perform the block transfer and change the current state to an override state, and then would restore the current state. Since some of the state may have been set by the first thread, the second thread may not be able to determine the current state. The state shadow RAM 515 is advantageously used to restore the current state without burdening the second thread with the task of determining the current state.

In the steps shown in FIG. 6B, the State Shadow Ram 515 effectively forms a 1-deep stack of state for saving and restoring the state of the graphics processing pipelines 400. In an alternative embodiment of this invention, the state shadow RAM 515 can be generalized to hold N copies of the graphics pipeline state. In one example usage of such an embodiment, a CPU thread starts off by executing using state copy X. If the CPU thread needs to override the state of the pipeline, the CPU thread switches to copy X+1. This operation is equivalent to the Use Passthru Mode 660 step in FIG. 6B. The operation may be generalized to move from state copy X to state copy X+1. If the CPU thread then needs to override the state again, the CPU thread moves from copy X+1 to X+2, and so on. Eventually, the CPU thread may restore the prior graphics state by moving from copy X+2, back to X+1, then back to copy X. Moving back to the previous copy of state is equivalent to the Use Replay Mode 670 step in FIG. 6B. The operation is generalized to move from state copy X+1 back to state copy X. In this way, the CPU threads may advantageously use N copies of state storage in the State Shadow Ram 515 to efficiently configure the graphics processing pipeline 400 to operate using different graphics processing states.

Another use for having N copies of state storage in the State Shadow Ram 515 is for quickly switching among N independent graphics contexts. The graphics processing pipelines 400 are normally shared among multiple applications via timeslicing. Each application gets full control of the graphics processing pipelines 400 for a particular timeslice period, and each application maintains an independent copy of state of the graphics pipeline. When the pipeline is switched between applications, the current state of the graphics processing pipelines 400 must be read out and saved for the current application, and then the new state must be written in and restored for the new application. The State Shadow Ram 515 provides a simpler and faster way to do these save and restore operations. The state of pipeline in automatically shadowed when using Track with Filter mode. So the state is automatically saved in the State Shadow Ram 515 for the current application. If the State Shadow Ram 515 holds N copies of the state, then a context switch operation becomes simply switching to the correct copy of state in the State Shadow Ram 515 for the new application and restoring all of this state to the graphics processing pipelines 400 using the Replay mode 670. Using the State Shadow Ram 515 is much simpler than shadowing the state in the device driver 103, and is typically faster than reading out the old state from the graphics processing pipelines 400 on a context switch.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for changing a state of a graphics processing pipeline, comprising:
storing first state data associated with a first state change method in a memory included in a front end of a graphics processing unit (GPU);
transmitting the first state data to the graphics processing pipeline to change the state of the graphics processing pipeline to a first state;
receiving, by the front end, a second state change method that includes second state data;
transmitting the second state data to the graphics processing pipeline, while the first state data is maintained in the memory of the front end, to change the state of the graphics processing pipeline from the first state to a second state, wherein the second state data is not written into the memory of the front end; and
after transmitting the second state data, transmitting the first state data from the memory of the front end to the graphics processing pipeline to change the state of the graphics processing pipeline from the second state back to the first state.

2. The method of claim 1, further comprising:
receiving a third state change method that includes third state data, wherein the first state change method and the third state change method are associated with a first control register in the graphics processing pipeline;
reading the first state data from the memory;
determining that the first state data matches the third state data; and
discarding the third state change method without transmitting the third state data to the graphics processing pipeline.

3. The method of claim 2, wherein the first state change method is associated with a first processing thread and the third state change method is associated with a second processing thread.

4. The method of claim 1, further comprising:
receiving a third state change method, wherein the first state change method and the third state change method are associated with a first control register in the graphics processing pipeline;
reading the first state data from the memory; and
transmitting the first state data to the graphics processing pipeline to change the graphics processing pipeline from the second state to the first state.

5. The method of claim 1, further comprising:
processing data in the graphics processing pipeline using the second state data,
wherein the processing comprises clearing a non-bound surface.

6. The method of claim 1, wherein the memory stores sets of state data and each set of the state data is a copy of a different state used by the graphics processing pipeline.

7. The method of claim 6, wherein each one of the sets of state data represents a different graphics context and the front end is configured to switch between the different graphics contexts that are used by the graphics processing pipeline.

8. The method of claim 1, further comprising:
receiving a third state change method including third state data, wherein the first state change method and the second state change method are associated with a first control register in the graphics processing pipeline;
reading the first state data from the memory;
determining that the first state data does not match the third state data;
writing the third state data to the memory; and
transmitting the third state data to the graphics processing pipeline to change the state of the graphics processing pipeline from the second state to the third state.

9. The method of claim 1, further comprising determining that space has been allocated in the memory for the first state change method; and storing the first state data in the memory.

10. The method of claim 1, storing the second state data in a control register within the graphics processing pipeline.

11. The method of claim 1, further comprising:

receiving a third state change method to invoke a macro program in a method macro expander;

executing a method macro expander program instruction to read the first state data from the memory; and generating and transmitting one or more commands to the graphics processing pipeline based on the first state data.

12. The method of claim 1, wherein the first state change method specifies wildcard data that are stored in the memory and are not transmitted to the graphics processing pipeline.

13. The method of claim 1, wherein transmitting the first state data from the memory to the graphics processing pipeline further comprises:

receiving an incoming method;

replacing third state data included in the incoming method with the first state data stored in the memory; and converting the incoming method to a control register write including control register data that is based on the first state data.

14. A non-transitory computer-readable storage medium storing instructions that, when executed by a processor, change the state of a graphics processing pipeline, by performing the steps of:

storing first state data associated with a first state change method in a memory included in a front end of a graphics processing unit (GPU);

transmitting the first state data to the graphics processing pipeline to change the state of the graphics processing pipeline to a first state;

receiving, by the front end, a second state change method that includes second state data;

transmitting the second state data to the graphics processing pipeline, while the first state data is maintained in the memory of the front end, to change the state of the graphics processing pipeline from the first state to a second state, wherein the second state data is not written into the memory of the front end; and after transmitting the second state data, transmitting the first state data from the memory of the front end to the graphics processing pipeline to change the state of the graphics processing pipeline from the second state back to the first state.

15. A graphics processing unit (GPU) comprising:

a graphics processing pipeline; and a front end configured to be switched between different modes of operation including a first mode, a second mode, and a third mode, wherein the front end operating in the first mode causes first state data for the graphics processing pipeline to be transmitted to the graphics processing pipeline to change the state thereof after storing the first state data in a memory of the front end, wherein the front end operating in the second mode causes second state data for the graphics processing pipeline to be transmitted to the graphics processing pipeline, while the first state data is maintained in the memory of the front end, to change the state of the graphics processing pipeline without storing the second state data in the memory of the front end, and wherein the front end operating in the third mode causes state data for the graphics processing pipeline to be changed based on data stored in the memory of the front end.

16. The system of claim 15, wherein the front end is further configured to:

operate in a fourth mode, wherein the front end operating in the fourth mode determines that received state data for the graphics processing pipeline matches state data stored in the memory and, in response to the determination, maintains the state data stored in the memory without transmitting the received state data.

17. The system of claim 15, wherein the memory stores sets of state data and each set of the state data is a copy of a different state used by the graphics processing pipeline.

18. The system of claim 15, wherein the front end is further configured to:

operate in a fourth mode wherein the front end operating in the fourth mode determines that received state data for the graphics processing pipeline does not match state data stored in the memory and, in response to the determination, writes the received state data to the memory and transmits the received state data to the graphics processing pipeline.

19. The system of claim 15, wherein the front end is further configured to, when the front end is operating in the first mode, determine that space has been allocated in the memory for the first state data before storing the first state data in the memory.

* * * * *